United States Patent [19]

Nakano et al.

[11] Patent Number: 4,512,728
[45] Date of Patent: Apr. 23, 1985

[54] COMBINED ROTARY PUMP AND COMPRESSOR UNIT

[75] Inventors: Hiromichi Nakano; Hideaki Sasaya; Mitsuo Inagaki, all of Okazaki; Kazuma Matsui, Toyohashi; Kunimasa Yoshimura, Mishima, all of Japan

[73] Assignees: Nippon Soken, Inc., Nishio; Nippondenso Co., Inc., Kariya; Toyota Jidosha Kabushiki Kaisha, Toyota, all of Japan

[21] Appl. No.: 575,999

[22] Filed: Feb. 1, 1984

[30] Foreign Application Priority Data

Feb. 8, 1983 [JP] Japan .................. 58-19944

[51] Int. Cl.³ .................. F01C 11/00; F01C 19/00
[52] U.S. Cl. .................. 418/3; 418/213
[58] Field of Search .............. 418/3, 5, 13, 102, 104, 418/210, 212–215, 266–270; 417/310

[56] References Cited

U.S. PATENT DOCUMENTS 2,766,693 10/1956 Wells .................. 418/3
2,935,023 5/1960 Jackson .................. 418/3

OTHER PUBLICATIONS

Jordan & Priester, *Refrigeration and Air Conditioning*, 1949, pp. 16–30.

Primary Examiner—Leonard E. Smith
Assistant Examiner—Jane E. Obee
Attorney, Agent, or Firm—Cushman, Darby & Cushman

[57] ABSTRACT

A vane-type rotary pump and a vane-type rotary compressor are integrated into a single unit and are driven by a common shaft. The compressor assembly is positioned at the rear of the pump assembly to minimize the number of mechanical seals required to seal the pump assembly along the shaft. The combined pump and compressor unit is provided with a regulating mechanism for reducing the compressor output during moderate or off modes of the refrigerant circuit.

10 Claims, 10 Drawing Figures

COMBINED ROTARY PUMP AND COMPRESSOR UNIT

BACKGROUND OF THE INVENTION

1. Field of the Invention

The present invention relates to a dual-function rotary machine and, more particularly, to a combined rotary pump and compressor unit capable of simultaneously pumping a liquid and a gaseous fluid. Such a combined pump and compressor unit may be suitably mounted on a vehicle engine for serving and operating both a power-steering system and an air-conditioning system of the vehicle by a single unit.

2. Description of the Prior Art

In vehicles equipped with both power-steering systems and air-conditioning systems, it has been customary to install an oil pump for feeding a working fluid under pressure to the power steering system separately from a compressor for pressurizing a refrigerant for the air-conditioning system. The pump and the compressor are mounted on the engine by brackets or supports independently from one another and are driven independently by the engine through their own drive belts and pulleys. The reasons for such independent installation and independent drive stem from the fact that the oil pump must be driven continuously as long as the engine is running, to maintain the power steering system in a state wherein it is operable at any time it is desired. Conversely, demand for the compressor output varies in accordance with the temperature of the vehicle room, i.e., operation of the compressor is not required during an "off" cycle of the air-conditioning system. Thus, in the prior art, the refrigerant compressor is not only mounted on the engine independently from the oil pump but is also generally provided with an electromagnetic clutch adapted to disconnect the compressor shaft from the drive pulley when the refrigerant output is not necessary.

SUMMARY OF THE INVENTION

An object of the present invention is to integrate a pump and a compressor into a single unit.

Other objects of the invention are a reduction in the number and cost of parts and components of the engine accessories including the pump and compressor, reduction in the size of such engine accessories, provision for a compact, lightweight engine, expansion of available space in the engine room, and a reduction of the labor required for mounting the accessories on the engine.

This invention provides a combined rotary pump and compressor unit wherein a pump assembly and a compressor assembly are housed within a common outer shell, and a pump rotor and a compressor rotor are driven by a single common shaft extending through the respective assemblies.

As is clear from the introductory part of this specification, the requirements for independent installation and drive of the above-mentioned units have led those skilled in the art away from an attempt of combining the pump and compressor into a single unit. The present inventors have, for the first time, integrated them into a single assembly.

This invention further provides features of the combined pump and compressor unit construction which facilitates assembly of the components of the unit.

The present invention also provides features of the pump and compressor unit construction which permit a simple and inexpensive shaft seal arrangement. When the engine, and hence, the pump and compressor unit are not operating, a substantial pressure is produced in the refrigerant circuit due to the temperature increase in the air-conditioning system, giving rise to the problem of refrigerant leakage through the clearance between the drive shaft and the compressor assembly. To avoid of this problem, a pair of relatively expensive mechanical seals must be placed around the shaft at both sides of the compressor assembly. According to the invention, the pump assembly is located at the front part of the outer shell through which the front part of drive shaft extends forward for connection with a drive pulley. The compressor assembly is arranged in the shell at the rear of the pump assembly. The shaft passes through the pump assembly and extends into the rear placed compressor assembly, the rear end of the shaft having a journal in a forward open blind bore formed in the compressor rear plate. Thus eliminating the need for providing an expensive mechanical seal around the rear end of the shaft. In the present invention, only one mechanical seal assembly is provided between the shaft and the pump rear plate, which mechanical seal is advantageously arranged by making use of a refrigerant inlet chamber formed within the shell between the pump assembly and the compressor assembly, the inlet chamber thus also serving as a seal chamber. The front part of the shaft is sealed with respect to the outer shell by a relatively inexpensive, standard oil seal. Thus, with this arrangement, a reliable shaft seal is obtained by using only one mechanical seal assembly.

Another feature of the invention is that the combined pump and compressor unit comprises a means for controlling the output from the compressor assembly. The output control means includes a flow control valve which regulates the flow of the pressurized refrigerant through a relief passage communicating the refrigerant inlet chamber with the high pressure zone of the compression chamber.

These and other features, as well as the advantages thereof, will be made apparent by the following description in conjunction with the accompanying drawings.

DESCRIPTION OF THE PREFERRED EMBODIMENTS

Referring to the drawings, FIGS. 1 through 4 illustrate a first embodiment of the combined rotary pump and compressor unit according to the present invention. The unit, generally designated by the reference numeral 10, includes a generally cylindrical outer shell 12 of, for example, metal castings. The outer shell 12 is formed with a stepped bore which includes a small diameter front stepped bore portion 14 serving as a bearing support for an antifriction bearing 16 fitted to a journal of shaft 18. The bore portion 14 is offset downward with respect to the longitudinal center line of the shell 12. Most of the remaining portion of the stepped bore in the shell 12, i.e., that designated 20, is substantially concentric with respect to the center line of the shell 12.

Figure 1:
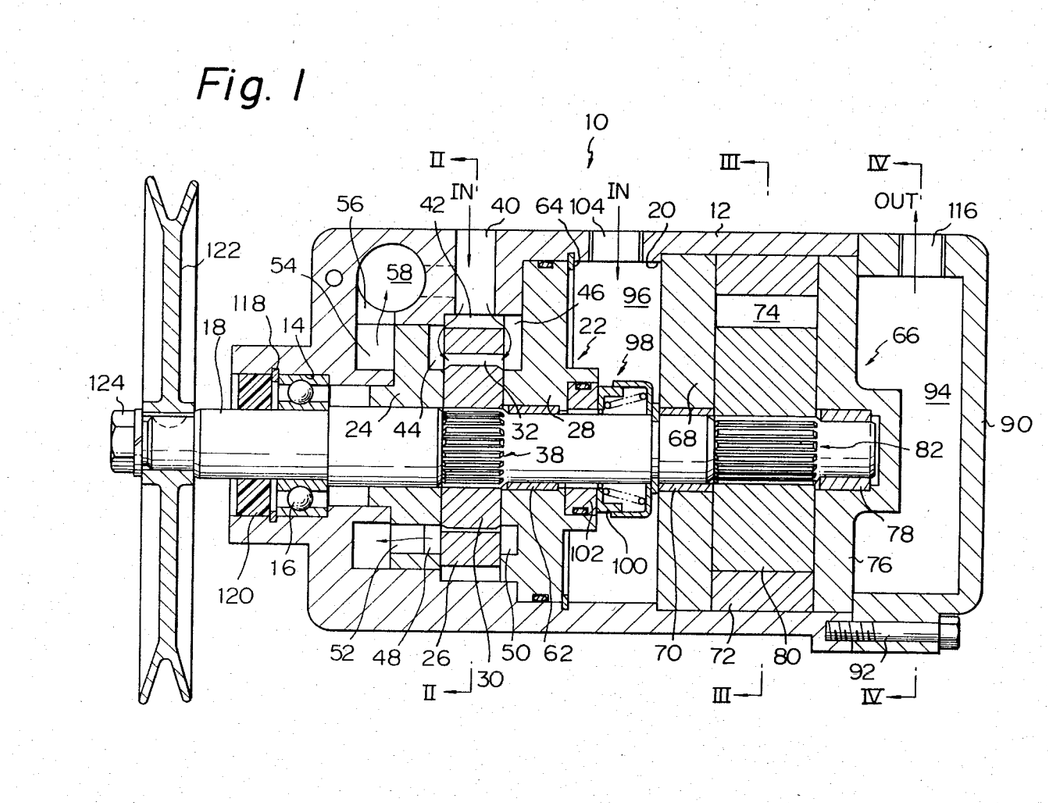
FIG. 1 is a longitudinal cross-sectional view of the combined pump and compressor unit constructed according to the present invention.
Figure 2:
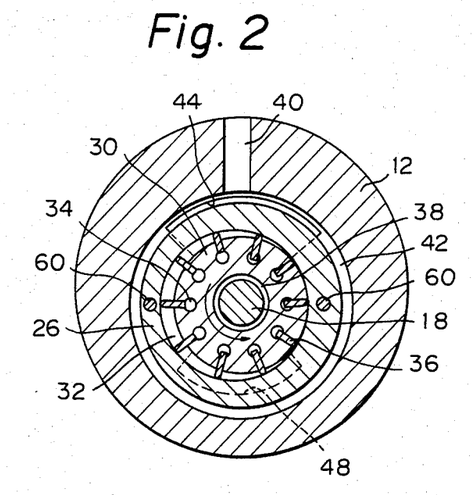
FIG. 2 is a cross-sectional view, on a reduced scale, taken along the line II—II in FIG. 1.

A pump assembly, generally designated by the reference numeral 22, is installed within the outer shell 12 by a sliding fit. The pump assembly 22 comprises a pump front plate 24, a pump cylinder 26, a pump rear plate 28, and a pump rotor 30. As best shown in FIG. 2, the pump cylinder 26 has a generally cylindrical pumping chamber 32 which is offset with respect to the rotational axis of the shaft 18. The pump rotor 30 is cylindrical and is provided with vane slots 34 in which vanes 36 are mounted in the usual manner. The vanes 36 are urged radially outward due to the centrifugal force as well as the back pressure in the slots 34, and into close sliding contact with the cylinder inner wall. The pump rotor 30 is coupled with the drive shaft 18 by way of splines or serrations 38. As the vaned rotor 30 rotates, the working fluid such as oil is drawn into the suction zone of the pumping chamber 32 through an inlet 40 in the shell 12, an annular space 42 between the shell 12 and the pump cylinder 26, and intake ports 44 and 46 in the front and rear plates 24 and 28. The pressurized working fluid leaves the high pressure zone of the pumping chamber 32 through discharge ports 48 and 50, a longitudinal passage 52, an annular passage 54, a radial passage 56, into an outlet 58.

The relative angular positioning between the pump front plate 24, the pump cylinder 26, and the rear plate 28 is assured by a pair of diametrically opposed positioning pins 60 (FIG. 2) having one end integrally secured to the front plate 24 and the other end extending longitudinally to the rear through holes in the pump rotor 30 into holes in the rear plate 28. The angular positioning of the pump rear plate 28 with respect to the outer shell 12 is accomplished by extending the shaft 18 through the rear plate 28 at an off-centered position. The pump rear plate 28 also serves as a bearing support for an antifriction bearing 62. Axial positioning of the entire pump assembly 22 is achieved by a circlip 64.

A compressor assembly, generally designated by the reference numeral 66, is fitted by sliding within the outer shell 12 at the rear of and spaced from the pump assembly 22. The compressor assembly 66 comprises a compressor front plate 68 acting also as a support for an antifriction bearing 70, a compressor cylinder 72 defining a concentric compression chamber 74 (FIG. 3), a compressor rear plate 76 serving also as a rear bearing support for an antifriction bearing 78, and a cylindrical compressor rotor 80 coupled with the shaft 18 by splines or serrations 82.

As for the pump assembly 22, a pair of diametrically opposed positioning pins 84 (FIG. 3) extend to the rear from the compressor front plate 68 through holes in the cylinder 72 into holes, not shown, in the rear plate 76, so that these three components of the compressor assembly are angularly positioned with each other during and after assembly. The compressor rotor 80 is concentric with respect to the shaft 18 but is offset with respect to the compressor cylinder 72. The compressor rotor 80 has four sliding vanes 86 which are guided in forward slanted vane slots 88 to come in close contact with the inner wall of the cylinder 72. The compressor rear plate 76 has a forward open blind bore receiving the bearing 78, which fits on the journal at the rearmost end of the shaft 18. The entire compressor assembly 66 is held in position by an end cover 90 fastened to the outer shell 12 by screws 92. The rear wall of the cover 90 is sufficiently spaced from the compressor rear plate 76 so that a chamber 94 is formed therebetween. This chamber 94 serves as a high pressure delivery chamber, and also acts as an oil sump and an oil separator chamber, as described later.

The space 96 defined within the outer shell 12 between the pump rear plate 28 and the compressor front plate 68 serves as a low pressure intake chamber for the compressor, and also serves as a seal chamber for a mechanical seal assembly 98. The seal assembly 98 is of the conventional type and comprises a rotary seal ring 100 which is sealed against the shaft 18, and which is held in a spring-biased sliding sealing contact with a fixed seal ring 102 which, in turn, is sealed against the pump rear plate 28.

Figure 3:
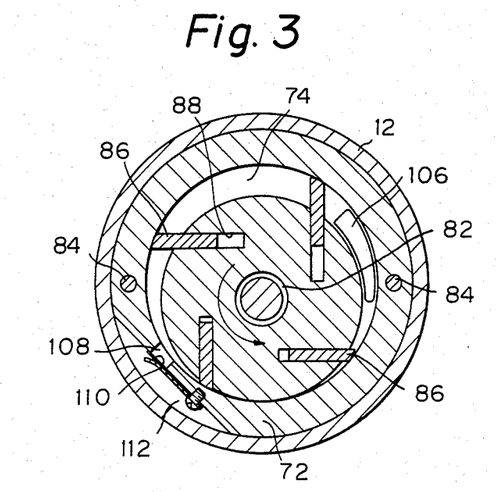
FIG. 3 is a cross-sectional view, on a reduced scale, taken along the line III—III in FIG. 1.
Figure 4:
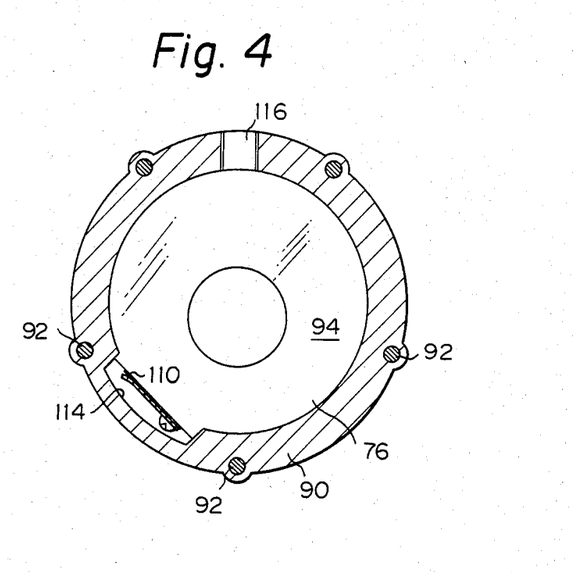
FIG. 4 is a cross-sectional view, on a reduced scale, taken along the line IV—IV in FIG. 1.

The refrigerant is drawn into the combined seal chamber and intake chamber 96 through an inlet 104 in the outer shell 12. The refrigerant is then introduced therefrom into the suction zone of the compression chamber 74 through an intake port 106 (FIG. 3) in the compressor front plate 68. The compressed gas leaves the high pressure zone of the compression chamber 74 through an discharge port 108, which is formed through the compressor cylinder 72, and opened and closed by a one-way reed valve 110, as shown in FIG. 3, into a passage or space 112 (FIG. 3) formed between the cylinder 72 and the outer shell 12 by recessing part of the cylinder 72. The refrigerant then passes through a passage (not shown) in the compressor rear plate 76, and through a recess 114 (FIG. 4) in the end cover 90, into the high pressure delivery chamber or oil sump 94. The lubricant born in the pressurized refrigerant is separated therefrom in the oil sump 94 and is distributed in the conventional manner to the working parts of the compressor, under the action of the high pressure in the delivery chamber 94, thereby cooling and lubricating the working parts. The refrigerant exempt from lubricant is taken out of the high pressure delivery chamber 94 through an outlet 116 in the outer shell 12.

To assemble the combined pump and compressor unit 10 according to the invention, the bearing 16 is first slid into the small bore portion of the outer shell 12 and is retained by a circlip 118. The shaft 18 is then inserted into the shell 12 through the bearing 6, from left to right as viewed in FIG. 1, and the shaft 18 is sealed by a standard oil seal 120. The pump front plate 24, pump cylinder 26, pump rotor 30, and pump rear plate 28 are mounted in the order mentioned around the shaft 18 and within the shell 12, the relative angular positioning of the front and rear plates and the cylinder being assisted by making use of the positioning pins 60 projecting from the front plate 24. The completed pump assembly 22 is retained by the circlip 64 and the shaft seal assembly is mounted thereafter. The compressor assembly is then mounted within the outer shell 12 in a similar manner, and the end cover 90 is fastened by screws 92 to the shell 12. Finally, a drive pulley 122 is keyed to the forward end of the shaft 18 and is fastened thereto by a nut 124.

Thus, the design of the combined pump and compressor unit according to the present invention enables the assembly thereof in an easy and rapid manner.

When the shaft 18 is driven, the pump assembly and compressor assembly are simultaneously operated so that the combined unit according to the invention supplies not only pressurized liquid but also gaseous fluid under pressure. Thus, a considerable economy is gained in the labor and cost required for installing the unit on the vehicle engine. Further, as the pump and compressor are integrated into a single unit, the engine room dimensions may be reduced or space available can be left in the engine room for the installation of other engine accessories.

Another advantage of the arrangement according to the invention is that it requires only one mechanical seal assembly to prevent refrigerant leakage along the shaft during the "off" cycle of the unit. This advantage is due to the disposition of the compressor assembly at the rear of the pump assembly. It should be noted that, if the compressor assembly were to be located at the front of the pump assembly, the shaft would extend through both the front and rear plates of the compressor so that a pair of mechanical seal assemblies must be provided on both sides of the compressor.

Figure 5:
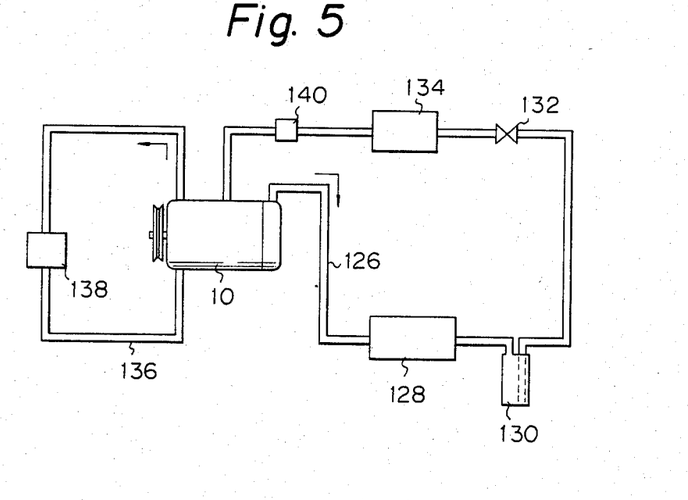
FIG. 5 is a diagram showing an application of the combined unit according to the present invention to an air-conditioning system and a power-steering system of a vehicle.

FIG. 5 illustrates the combined pump and compressor unit 10 according to the present invention connected to an air-conditioning system and a power-steering system of a vehicle. The air-conditioning system includes a refrigerant line 126 connected to the inlet and outlet of the unit 10. Arranged in the refrigerant line 126 are a condensor 128, a liquid separator 130, an expansion valve 132, and an evaporator 134, each being of the conventional type. The power-steering system includes a working fluid line 136 passing through a double-acting cylinder unit 138 coupled to steering rods, not shown, in the usual manner.

As the combined pump and compressor unit is driven continuously while the engine is running, the compressor output will become excessive under a high-speed operating condition of the engine, so that the refrigeration ability of the system surpasses the necessary level thereby causing the problem of icing in the evaporator. This is particularly so when the flow rate of the air passing through the evaporator is reduced. According to the present invention, this problem is solved by providing a differential pressure valve 140 downstream of the evaporator 134, to maintain a constant vapor pressure in the evaporator.

Figure 6:
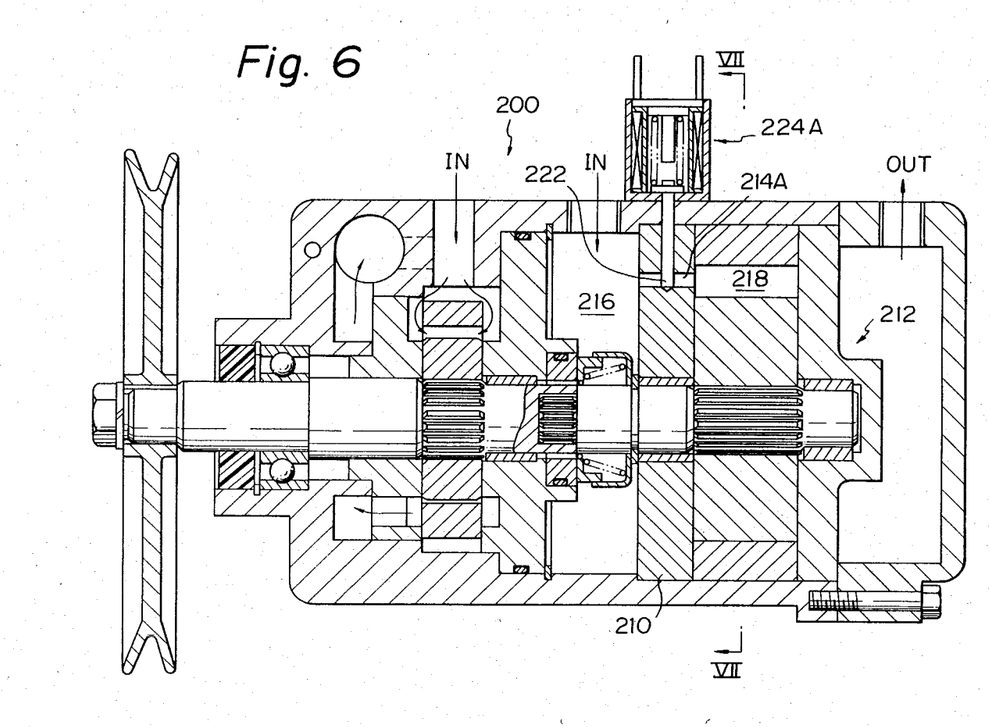
FIG. 6 is a longitudinal cross-sectional view of another form of the combined pump and compressor unit according to the present invention.
Figure 7:
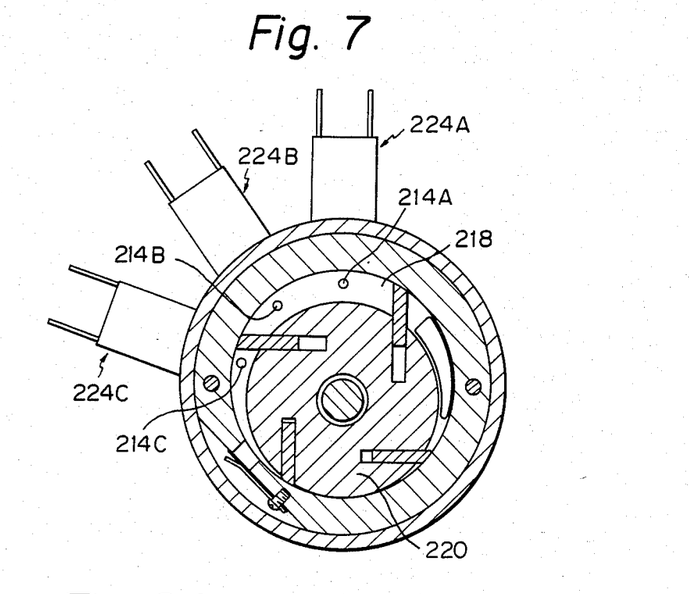
FIG. 7 is a cross-sectional view, on a reduced scale, taken along the line VII—VII in FIG. 6.
Figures 8A, 8B:
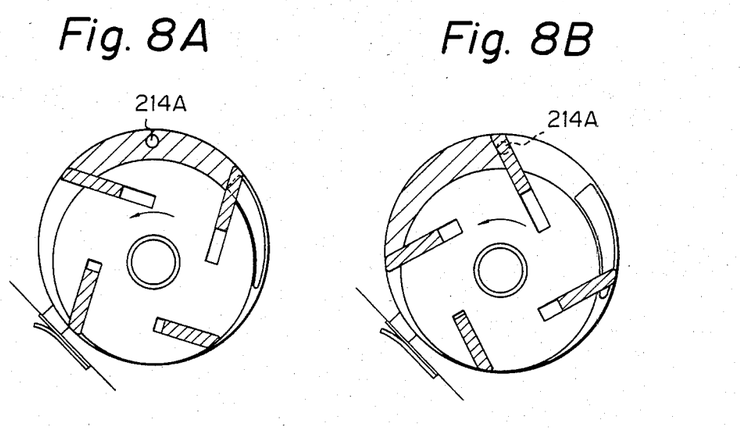
FIGS. 8a and 8b are diagrams showing the function of the relief passage.

FIGS. 6 and 8 illustrate a second embodiment of the combined pump and compressor unit according to the invention. The unit 200 differs from the unit 10 shown in FIGS. 1 through 4 only in that it is provided with a regulating mechanism for controlling the compressor output, and that the drive shaft is composed of two-piece sections coupled together by serrations or splines. Therefore, only the different parts and members will be described hereinafter.

The front plate 210 of the compressor assembly 212 is provided with three relief passages 214A, 214B, and 214C, each communicating between the low pressure intake chamber 216 and the compression chamber 218. The first passage 214A is located near the top dead center position and the other two passages, 214B and 214C, are spaced in sequence at an angle of about 30 degrees in the direction of rotation of the rotor 220. The relief passages are adapted to be opened or closed, respectively, by associated valves, one of which is shown in FIG. 6 at 222. The valves are operated by solenoid actuators 224A, 224B, and 224C.

Operation of the output regulating mechanism will be described with reference to FIGS. 8A and 8B. In the maximum output operation mode, all the solenoids are deenergized so that the relief valves shut off the relief passages. In this mode, the maximum suction volume between two successive vanes is obtained, as shown by the hatched area in FIG. 8A.

When the solenoid actuator 224A is energized to open the relief passage 214A, the refrigerant in the compression chamber 218 escapes toward the low pressure chamber 216 during the first stage of the compression cycle until the trailing vane passes the relief passage 214A, as shown in FIG. 8B. In this mode, the suction volume is reduced, as shown by the hatched area in FIG. 8B, so that the compressor output is reduced accordingly.

When the first two solenoid actuators 224A and 224B are activated to open the relief passages 214A and 214B, the output will be reduced to about 30% of the maximum value.

Finally, as all three solenoid actuators are energized, it is possible to reduce the compressor output to several percent of its maximum value. The small amount of refrigerant output obtained during this minimum output mode of compressor operation is desirable for cooling and lubricating the working parts of the compressor assembly, because, in the combined pump and compressor unit according to the present invention, the compressor rotor is rotated insofar as the engine is operating, regardless of whether or not the air-conditioner is operating. Thus, this embodiment enables the operation of the combined pump and compressor unit at a minimum energy consumption during the "off" cycle of the air-conditioner, while at the same time assuring the cooling and lubrication of the the working parts as well as avoiding the icing problem.

Figure 9:
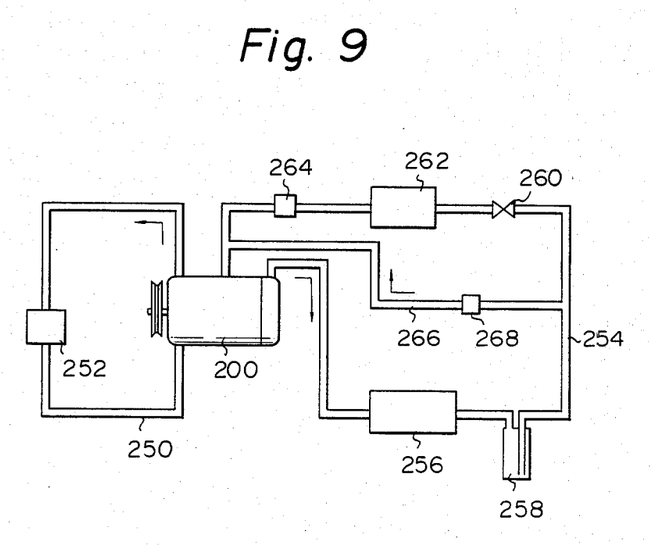
FIG. 9 is a diagram showing an application of the unit in FIG. 6 to an air-conditioning system and a power-steering system.

FIG. 9 shows the combined pump and compressor unit 200, the oil outlet and inlet of which are connected to a hydraulic line 250 including a power steering hydraulic cylinder 252, the gas outlet and inlet being connected to a refrigerant line 254 passing through a condensor 256, an oil separator 258, an expansion valve 260, an evaporator 262, and a differential pressure valve 264. A by-pass conduit 266 is provided to bypass the expansion valve 260 and evaporator 262. The flow of refrigerant in the bypass conduit 260 is regulated by a shut-off valve 268 which will open or close in response to the temperature of the vehicle room.

We claim:

1. A combined integrated rotary pump and compressor unit comprising:
    an outer shell having a stepped bore therethrough extending from a front end to a rear end thereof, said stepped bore including a front eccentric small bore portion having a center line offset from the center line of said outer shell, the remaining portion of said stepped bore being substantially concentric to the center line of the shell;
    a vane-type rotary pump assembly housed within said outer shell in the front part of said remaining concentric bore portion, said pump assembly including a pump front plate, a pump rear plate, a pump cylinder sandwiched between said pump front and rear plates to define a pumping chamber therebetween, and vaned pump rotor rotatably received in said pumping chamber and having a rotational axis aligned with the center line of said front eccentric bore portion;

a vane-type rotary compressor assembly received within said outer shell in the rear part of said concentric bore portion, said compressor assembly including a compressor front plate, a compressor rear plate, a compressor cylinder sandwiched between said compressor front and rear plates to define a compression chamber therebetween, and a vaned compressor rotor rotatably received in said compression chamber and having a rotational axis aligned with the center line of said front eccentric bore portion;

said compressor front plate being spaced from said pump rear plate to define therebetween within said outer shell a low pressure intake chamber for said compressor assembly, said intake chamber also serving as a seal chamber;

each of said pump front plate, pump rotor, pump rear plate, compressor front plate, and compressor rotor having a through bore longitudinally aligned with each other and centered on the center line of said front eccentric bore portion of the outer shell, said compressor rear plate having a forwardly open blind bore centered on the center line of said front eccentric bore portion;

a shaft journaled in said front eccentric bore portion in said outer shell and in said blind bore in said compressor rear plate and extending through said through bores to be drivingly coupled with said pump rotor and compressor rotor, said shaft having a forward end projecting forward through said front bore portion;

a drive pulley fastened to said forward end of the shaft;

a mechanical shaft seal assembly mounted in said seal chamber around said shaft to prevent leakage along the shaft;

an end cover secured spaced from said compressor rear plate to the rear end of said outer shell to define a high pressure delivery chamber also serving as an oil sump;

inlet means for introducing a working fluid into the suction zone of said pumping chamber;

outlet means for conducting the pump output from the high pressure zone of said pumping chamber;

inlet means for introducing a gaseous fluid into said low pressure intake chamber;

a passageway in said compressor assembly for communicating said low pressure intake chamber with the suction zone of the compression chamber;

a passageway in said compressor assembly for communicating the high pressure zone of the compression chamber with said high pressure delivery chamber; and outlet means for transmitting the compressor output from the high pressure delivery chamber.

2. In combination with an air-conditioning system for an engine driven vehicle and having a refrigerant circuit passing through an evaporator, a combined rotary pump and compressor unit according to claim 1 and driven by said engine, with said compressor inlet means and output outlet means connected to said refrigerant circuit to form a closed loop circuit, and a fluid flow control valve of the differential pressure type disposed in said refrigerant circuit between said evaporator and said compressor inlet means.

3. In combination with an air-conditioning system for conditioning the air in a room of an engine driven vehicle and having a refrigerant circuit in which a condensor, a liquid separator, an expansion valve, and an evaporator are arranged in the order mentioned, a combined rotary pump and compressor unit according to claim 1 and driven by said engine, with said compressor inlet means and outlet means connected to said refrigerant circuit to form a closed loop circuit, a bypass passage connecting the portion of said circuit located between said separator and said expansion valve with the portion of said circuit located between said evaporator and said compressor inlet, and a valve operable to control the flow rate through said bypass passage in response to the temperature of the vehicle room.

4. A combined pump and compressor unit as claimed in claim 1, wherein said shaft is coupled with said pump rotor and compressor rotor by means of a spline coupling.

5. A combined pump and compressor unit as claimed in claim 1, further comprising means for angularly positioning said pump front plate, pump cylinder, and pump rear plate with each other during assembly of the unit.

6. A combined pump and compressor unit as claimed in claim 5, wherein said positioning means comprises a positioning pin extending rearward form said pump front plate through said pump cylinder into said pump rear plate.

7. A combined pump and compressor unit as claimed in claim 1, further comprising means for angularly positioning said compressor front plate, compressor cylinder, and compressor rear plate with each other during assembly of the unit.

8. A combined pump and compressor unit as claimed in claim 7, wherein said positioning means comprises a positioning pin extending rearward from said compressor front plate through said compressor cylinder into said compressor rear plate.

9. A combined pump and compressor unit as claimed in claim 1, further comprising means for regulating the flow rate of the output from said compressor assembly.

10. A combined pump and compressor unit as claimed in claim 9, wherein said compressor fornt plate has a relief passage communicating said low pressure intake chamber with the high pressure zone of the compression chamber, and wherein said regulating means comprises a valve operable to control the flow rate through said relief passage in response to the demand for the compressor output.

* * * * *